United States Patent
Papillon et al.

(10) Patent No.: US 11,454,122 B2
(45) Date of Patent: *Sep. 27, 2022

(54) PRE-FORMED PLUG WITH INTER-BLADE PROFILES FOR HYDRAULIC TURBINES

(71) Applicant: GE Renewable Technologies, Grenoble (FR)

(72) Inventors: Benoît Papillon, Quebec (CA); Carl-Anthony Beaubien, Quebec (CA); David Allan Scott, Quebec (CA); Laurent Bornard, Quebec (CA); Louis Mathieu, Quebec (CA)

(73) Assignee: GE Renewable Technologies, Grenoble (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/527,615

(22) Filed: Jul. 31, 2019

(65) Prior Publication Data

US 2020/0040740 A1     Feb. 6, 2020

(30) Foreign Application Priority Data

Aug. 3, 2018    (EP) .................................. 18306071

(51) Int. Cl.
*F01D 5/14*       (2006.01)
*F03B 11/00*     (2006.01)
*F03B 3/12*       (2006.01)
*F01D 5/22*       (2006.01)

(52) U.S. Cl.
CPC .............. *F01D 5/147* (2013.01); *F03B 3/125* (2013.01); *F03B 11/002* (2013.01); *F01D 5/225* (2013.01); *F05D 2220/32* (2013.01); *F05D 2230/60* (2013.01)

(58) Field of Classification Search
CPC ......... F03B 3/125; F03B 11/002; F01D 5/225
USPC .......................................................... 416/196
See application file for complete search history.

(56) References Cited

U.S. PATENT DOCUMENTS

| | | | | |
|---|---|---|---|---|
| 1,529,456 | A | * | 3/1925 | White .................... F03B 3/125 416/224 |
| 1,942,995 | A | | 1/1934 | Biggs |
| 2,494,623 | A | | 1/1950 | Landt |
| 3,305,215 | A | | 2/1967 | Ignacy et al. |
| 3,719,439 | A | * | 3/1973 | Dawson et al. .......... F01D 5/22 416/196 R |

(Continued)

FOREIGN PATENT DOCUMENTS

| | | |
|---|---|---|
| CN | 2077864 U | 5/1991 |
| CN | 103547792 A | 1/2014 |

(Continued)

OTHER PUBLICATIONS

EP Search Report, dated Oct. 31, 2018.

(Continued)

*Primary Examiner* — Courtney D Heinle
*Assistant Examiner* — Michael K. Reitz
(74) *Attorney, Agent, or Firm* — Dority & Manning, P.A.

(57) ABSTRACT

The invention concerns an inter-blade profile (14) for a turbine runner blade, said inter-blade profile (14) comprising a profile (16), and a plug (18), forming a basis of the profile (16) and intended for being inserted into a corresponding hole (21) made in a blade.

14 Claims, 5 Drawing Sheets

(56) References Cited

U.S. PATENT DOCUMENTS

| | | | | |
|---|---|---|---|---|
| 4,734,010 | A | * | 3/1988 | Battig ............... F01D 5/22 416/196 R |
| 5,483,034 | A | * | 1/1996 | Havard ............ B23K 26/0604 219/121.64 |
| 5,879,130 | A | | 3/1999 | Bever et al. |
| 6,146,094 | A | * | 11/2000 | Obana ................ F04D 29/284 415/200 |
| 6,805,531 | B2 | * | 10/2004 | Iida .................. B29C 45/0062 415/206 |
| 7,071,445 | B2 | * | 7/2006 | Launais ........... B23K 26/0608 219/121.64 |
| 9,221,121 | B2 | * | 12/2015 | Lin ................... B23K 15/0053 |
| 2003/0127754 | A1 | | 7/2003 | Ruzicka et al. |
| 2004/0129838 | A1 | | 7/2004 | Lisy et al. |
| 2011/0206518 | A1 | * | 8/2011 | Bouvet ................ F03B 3/125 416/185 |
| 2016/0327012 | A1 | | 11/2016 | Beaulieu et al. |

FOREIGN PATENT DOCUMENTS

| | | | |
|---|---|---|---|
| CN | 105668770 A | | 6/2016 |
| DE | 101 22 524 A1 | | 8/2002 |
| DE | 10 2013 210737 A1 | | 12/2014 |
| EP | 2 444 658 A1 | | 4/2012 |
| EP | 3 051 125 A1 | | 8/2016 |
| JP | S58 160560 A | | 9/1983 |
| WO | WO-2014090885 A1 | * | 6/2014 ............. F03B 3/125 |

OTHER PUBLICATIONS

Related U.S. Appl. No. 16/191,951, filed Nov. 15, 2018.
Related U.S. Appl. No. 16/325,095, filed Aug. 18, 2017.
Related U.S. Appl. No. 16/462,590, filed Nov. 9, 2017.
Chinese Office Action, dated Jun. 21, 2022.

* cited by examiner

PRE-FORMED PLUG WITH INTER-BLADE PROFILES FOR HYDRAULIC TURBINES

TECHNICAL FIELD AND PRIOR ART

The invention relates to the field of hydropower industry.

FIG. 1 illustrates a known turbine runner, comprising runner blades 2 arranged between a crown 4 and a band 6. Each of these blades extends between a leading edge 8 and a trailing edge 10 from which water flows into a draft tube (not shown on FIG. 1). The present application applies not only to such turbines (Francis and others) and to turbine-pump runners possessing a crown and a band, but also to those with only a crown (propeller, or Kaplan, or diagonal flow and others).

Hollow inter-blade profiles 12 can be installed between blades in such a hydraulic turbine in order to provide aeration to the turbine flow. More precisely, as explained in US 2016/0327012, air is injected into the water flow in order to increase dissolved oxygen content in the water flowing through the turbine. More precisely, each such hollow inter-blade profile provides an internal channel and aeration passages located in the profile surface for air to flow through from air channels in the blade into the flowing water. Oxygen of the injected air is then transferred to the oxygen depleted flowing water, increasing dissolved oxygen levels as the air bubbles mix with the surrounding water.

Fabrication of such inter-blade profiles and their positioning on the blades present challenges.

The inter-blade profiles are fixed on the corresponding blades after the runner has been assembled: precise positioning of the inter-blade profile can be difficult to ensure and there is only limited work space between runner blades for final assembly and finishing. Yet, they must be carefully positioned to prevent flow separations and cavitation due to profiles that are hydraulically poorly oriented.

Another difficulty is that the geometry of a turbine runner is generally fixed and cannot be modified without removing the turbine runner and replacing it.

There is thus the problem of finding a new structure of inter-blade profiles and of blades enabling a simpler fabrication process of a runner.

There is also the problem of finding a process for reducing the number of operations required by an operator who must work between runner blades.

SUMMARY OF THE INVENTION

The present invention first concerns an inter-blade profile for a turbine runner blade, said inter-blade profile comprising a profile, and a plug, forming a basis of the profile.

Said plug is intended for being inserted into a corresponding hole made in a runner blade with an air channel. The inter-blade profile is thus pre-shaped on a plug that can be positioned in a corresponding hole on the runner blade.

The plug, in cooperation with the hole, determines the position and orientation of the inter-blade profile in the correct orientation and improves manufacturability and ease of assembly. Any possibility of poor orientation is therefore avoided.

Use of a pre-machined inter-blade profile plug addresses the difficulties mentioned above in connection with prior art turbines comprising inter-blade profiles. In particular, use of a plug for installing the inter-blade profile ensures a single orientation of said profile and eliminates the possibility of misalignment.

Since the inter-blade profile has been designed to be well oriented to the water flow, ensuring the profile can only be oriented in one direction reduces the possibility of flow separations or cavitation that may occur when the profile is installed in the wrong orientation.

An inter-blade profile according to the invention can comprise at least one zone, or fillet with at least one finite radius of curvature r between at least a lower part of the profile and at least part of an upper side of the plug, which reduces negative hydraulic phenomena, in particular horseshoe vortex behaviour.

Said radius of curvature r can be variable along at least part of said lower part of the profile and at least part of said upper side of the plug.

The shape of the inter-blade profile, including one or more zones with at least one finite radius of curvature r for reducing horseshoe vortex behaviour, is thus pre-machined and reduces final assembly time and risks of non-compliance with dimensional requirements.

Since such features are pre-fabricated on the plug and the profile, there is no need for a manual control during their fabrication between two blades of a turbine runner, which eliminates manual operations in small spaces.

An inter-blade profile according to the invention can comprise at least one aeration passage, for example at least one slot and/or at least one hole through at least one of its lateral sides.

The aeration passage(s) can have complex geometries; access is not available or easy for machining such passages of an already installed inter-blade profile.

Furthermore, cleaning or maintaining or repairing such passages, and/or the channel inside the profile and located behind said passages, is difficult. Cleaning is in particular necessary when foreign materials have passed through the aeration passages and are stuck in the channel behind them, causing a reduction in the aeration potential of the turbine and reducing the dissolved oxygen levels in the tailrace below the power plant.

There is also the need to adapt the shape of these aeration passage(s) and/or of the inter-blade profile to new operating conditions of the runner. The geometry of a turbine runner is fixed and can be modified only by removing the whole turbine runner and by replacing it (which is very time consuming and very costly). Alternatively, machining the aeration passages without removing the whole turbine runner creates other difficulties because of the reduced space available for machining and the need for specialised tools.

For the above reasons, in a preferred embodiment, an inter-blade profile according to the invention comprises at least one removable cover plate, said cover comprising at least one aeration passage, for example at least one slot and/or at least one hole, and securing means, for example at least one hole for at least one screw or bolt, for securing said removable cover onto said inter-blade profile and demounting said removable cover from said inter-blade profile when needed.

A detailed machining of the removable cover plate, in particular of its outside surface, can be performed since this cover plate is readily accessible, thus increasing accuracy and reducing the risks of non-compliant machining.

Furthermore, long-term maintenance of the aeration passages and of the aeration channel, because the cover plate is removable, can be facilitated. There is much better access to the aeration channel when the cover plate is removed, making it easier to clean it and to remove any foreign materials that are too large to fit through the aeration passages.

The removable cover-plate is smaller than the whole inter-blade profile, so that weight is not an issue and the cover plate can be removed without disassembling the turbine, reducing stoppage time.

This permits a replacement of a damaged cover plate or replacement of a cover plate by a different cover plate having a different geometry, for example a different geometry of the aeration passage(s) and/or of the hydraulic shape of the profile itself, not requiring a major rehabilitation of the whole turbine.

Another advantage is that modifications of the geometry of the aeration passages and/or of the inter-blade profile can be made directly on the removable cover plate. Design improvements and modifications can be incorporated directly into the removable and replaceable cover plate without requiring a major stoppage to remove and replace the turbine runner.

The invention also concerns a runner blade, comprising a blade and at least one inter-blade profile according to one of the above embodiments of the invention.

Said at least one inter-blade profile and said blade can be assembled or joined, for example welded, together.

The invention also concerns a method for fabricating a turbine runner, comprising runner blades arranged between a crown and a band or extending from a crown or from a central hub, at least one of said runner blades being according to the invention, said method comprising assembling said blades with at least said crown or said central hub, and then assembling said at least one blade according to the invention and at least one inter-blade profile according to the invention.

The invention also concerns a turbine runner, comprising runner blades, at least one of them according to the invention, said runner blades being arranged between a crown and a band or said runner blades extending from a crown or central hub.

The invention also concerns a method for fabricating a runner blade, comprising a blade and at least one inter-blade profile according to the invention, said method comprising:
  fabricating a blade comprising an air passage and at least one hole adapted to contain the plug of said at least one inter-blade profile;
  positioning the plug of said inter-blade profile in said hole and assembling said plug with said blade, for example by welding.

A method according to the invention increases the manufacturability of turbine runners.

The combination of a plug and a hole improves assembly by fixing the position of the inter-blade profile prior to assembly. Features on the plug, such as pre-machined weld radii, reduces the time necessary to weld these features during final assembly and machining.

In the particular case where an inter-blade profile according to the invention comprises an internal channel and a removable cover plate covering at least part of said internal channel or a runner blade comprising such an inter-blade profile, said method comprising removing said removable cover plate and:
  cleaning and/or maintaining and/or machining said internal channel and/or at least one aeration passage of said removable cover plate;
  and/or replacing said removable cover plate with another removable cover plate and/or machining at least one aeration passage of said removable cover plate and fixing it again against said inter-blade profile.

The advantages of a method according to the invention are in particular those already mentioned above.

When the inter-blade profile itself is removable, said method according to the invention can further comprise a step of removing said inter-blade profile from said blade, then removing said removable cover plate and performing one of the above steps.

DETAILED DISCLOSURE OF EMBODIMENTS

Figure 2A:
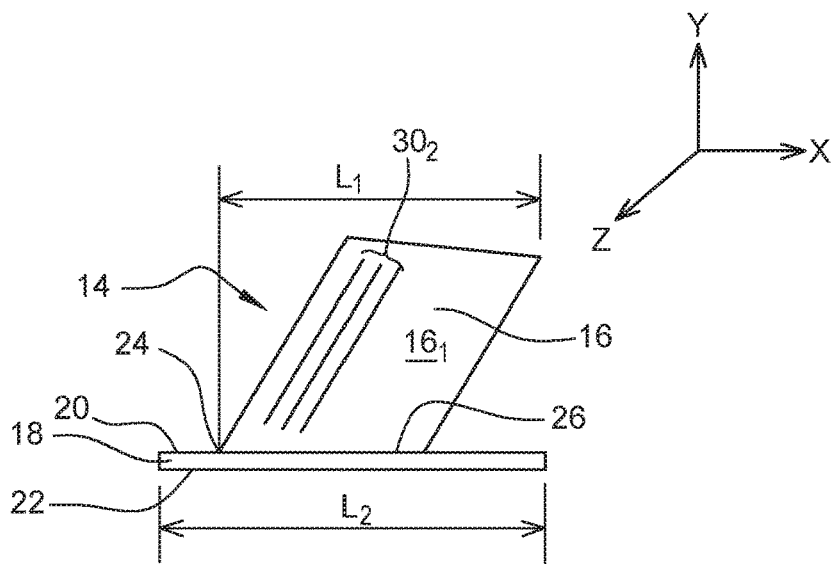
FIGS. 2A-2C are different views of an inter-blade profile on a plug, according to the invention, before insertion into a corresponding hole in a runner blade.
Figure 2B:
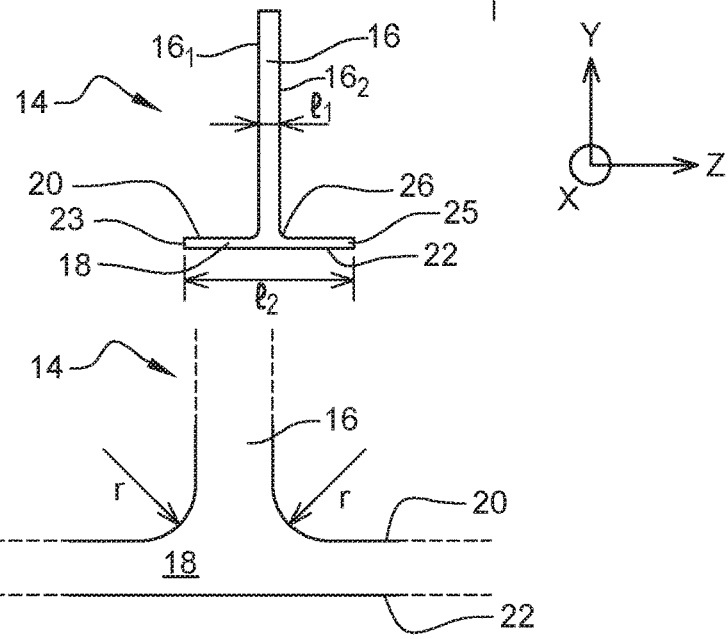
Figure 2C:
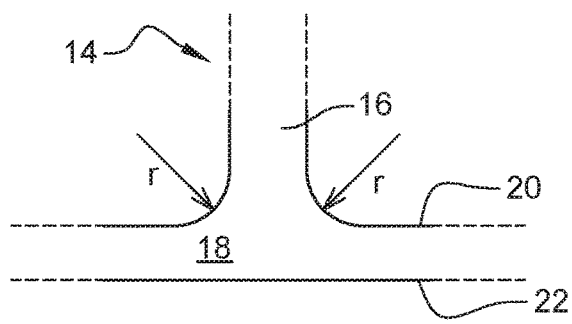
Figure 2D:
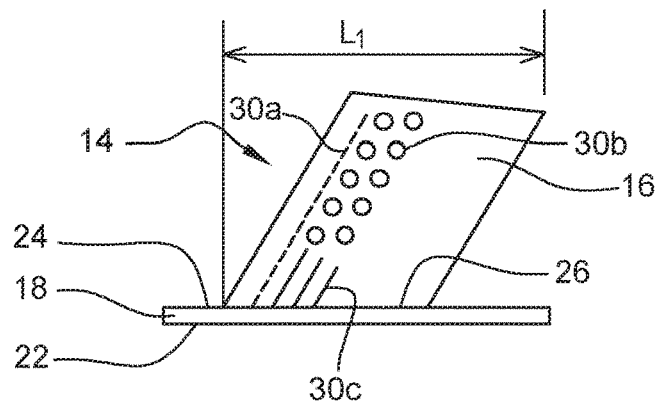
FIG. 2D shows different shapes of aeration passages that can be implemented in the present invention, other geometries can however be considered FIG. 3 illustrate a step of fabrication of a blade including a hole in order to position therein a plug of an inter-blade profile according to the invention.

FIGS. 2A and 2B show lateral front views of an inter-blade profile 14 according to the invention. FIG. 2C is an enlarged view of a part of the inter-blade profile 14. FIG. 2D shows alternative shapes of aeration passages that can be implemented in the present invention. Other geometries can however be considered.

The inter-blade profile 14 comprises a profile 16, delimited by 2 lateral walls $16_1$, $16_2$, and a plug 18 (FIGS. 2A, 2B), forming a basis of the profile 16.

Figure 3:
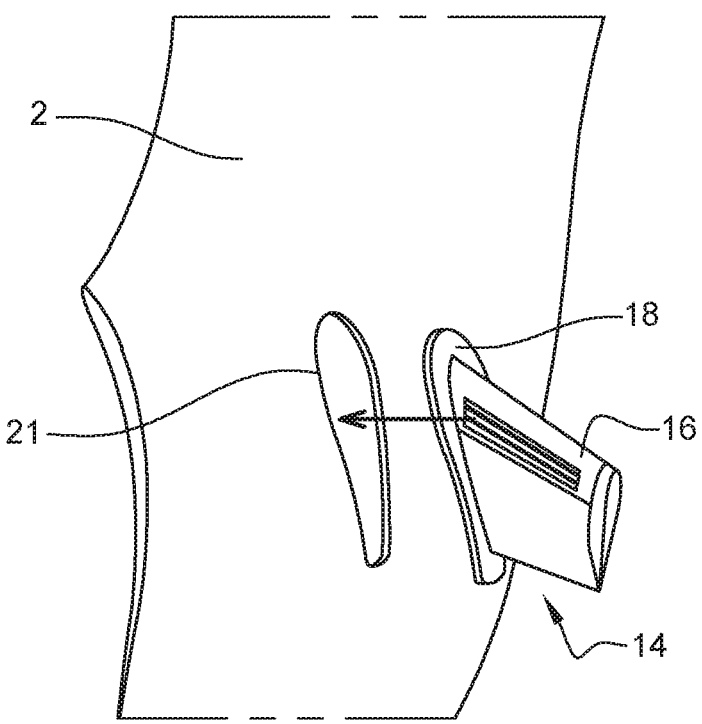

Said plug is intended to be inserted into a corresponding hole 21 made in the blade as illustrated on FIG. 3. The profile 16 and the plug 18 can be separately fabricated and then assembled or can be fabricated as one single piece.

The profile 16 has any shape adapted to the hydraulic requirements. In particular, it has at least one aeration passage, for example at least one slot(s) 30 (FIG. 2A) and/or hole(s) through at least one of its walls $16_1$ and/or $16_2$ for the circulation of air from the blade to the water. For certain ranges of operating conditions of the turbine one or more slots and/or holes can be located on both sides $16_1$, $16_2$ of the profile. It can be noted that the aeration passage(s) can have other possible geometries: one or more straight line(s) (as on FIG. 2A), or separated straight lines (ref 30a on FIG. 2D), or comprising one or more hole(s) (ref 30b on FIG. 2D), or straight parallel lines (ref 30c on FIG. 2D), all these geometries of FIGS. 2A and 2D being possibly combined. For example, the passage geometries can comprise any shape chosen among: round holes, straight slots, chevrons, stars, horseshoe, etc.

It shall be noted that the geometries previously mentioned or illustrated in FIG. 2D, do not limit the scope of the present invention and the skill in the art can consider any other shape.

The plug substantially extends in a plane XZ (FIG. 2A) and has an upper side 20, turned to the profile itself and a lower side 22, which faces inside the blade after assembly of the inter-blade profile with the blade. It is limited by a contour or an outline having one lateral side 23 on one side of the profile 16, and another lateral side 25 on the other side of the profile 16 (FIG. 2B). The contour can for example have a general oval shape.

The profile substantially extends in a plane XY (FIG. 2A; it therefore extends substantially perpendicularly to the extension plane of the plug). It has in this XY plane a length or an extension $L_1$ (measured along axis X between the two most distant points of said profile) where the length of the profile at any section is smaller than the length or extension $L_2$ of the plug. As illustrated in FIG. 2A, the length of the profile can vary in the y-direction. For example $L_2$ can be between 100 mm and 700 mm; depending on the needs; for example $L_2$ can be about 500 mm or close to 450 mm. Other values outside this range are possible. The plug substantially extends in a plane XZ (FIG. 2A) perpendicularly to plane XY.

The profile has, along a Z axis which extends perpendicularly to plane XY (FIG. 2B), width $l_1$ (measured along axis Z between the two most distant points of said profile) where the width of the profile in any section must be smaller than the width $l_2$ of the plug (measured along axis Z between the two most distant points of the lateral sides 23, 25 of the plug). For example $l_2$ can be between 30 mm and 300 mm, depending on the needs; for example $l_2$ can be about 50 mm or 100 mm. Other values outside this range are possible.

The thickness of the profile is taken along the z direction. Said thickness can vary along the height of the profile. For example the thickness can be longer at the base than at the top, or vice-versa. The hydraulic shape of the profile can thus be constant or can vary along the height of the profile in length, thickness or shape.

The profile and its plug can be pre-shaped to have all the attributes normally achieved after welding. In particular, fillets can be provided at the intersections 24, 26 of the profile and the upper side 20 of the plug. An example of such a fillet is shown on FIG. 2C: it forms a convex zone with a finite and possibly variable radius of curvature r between the lower part of the profile and the upper side 20 of the plug. These fillets reduce negative hydraulic phenomena at the intersections 24, 26 such as vortex flows and cavitation and help to reduce mechanical stresses at the intersection of the two surfaces.

These fillets are pre-fabricated before assembly of the inter-blade profile with the blade, thus avoiding a manual control of the weld fillet radius during assembly between 2 neighbouring blades of an already assembled turbine, the space between such 2 neighbouring blades being limited.

The plug is shown on FIGS. 2A-2D having flat upper and lower sides 20, 22; however, it can have any other shape, adapted to the surface of the blade where the inter-blade profile is to be located.

As can be understood from FIG. 3, a profile 16 and its plug 18 are fabricated separately from the blade 2. A hole 21 is made in the blade (to join the air channel in the blade to the hollow inter-blade profile, see FIG. 3) before the blade is mounted between a crown 4 and a band 6 as on FIG. 1 so that the plug can be positioned and fixed (for example, but not limited to, welded, bolted, glued ...) therein. Preferably, the profile and its plug are assembled with the blade after the blades are mounted between a crown 4 and a band 6 as on FIG. 1, which is much easier than the difficult and unprecise positioning of the profile according to the prior art, which consists in positioning the profile (without plug) on the blade (without hole in the blade) and welding both together in situ with the best possible (but necessarily unprecise) positioning. Alternatively, the profile and its plug are assembled with the blade before the blades are mounted between the crown 4 and the band 6, which is also much easier than according to the prior art.

The profile is hollow and an internal channel of the profile communicates through said hole 21 with a channel inside the blade for the circulation of air through the blade, then through said internal channel of the profile and then through at least one aeration passage in the profile surface and finally into the flowing water.

The profile is fabricated with its plug. This can be done in a monobloc (as a single piece) or as a multi-piece assembly joining a base with a profile. The plug has a shape that fits into the hole 21 made in the blade (see FIG. 3) so that it can be positioned and welded therein. The weld seam around the plug (between the lateral sides 23, 25 of the plug and the hole) can be removed through grinding and polishing. More precisely, the hole is slightly larger and longer than the plug, so that the plug and the blade can be easily welded together after the plug is positioned inside the hole. The weld seam ensures water tightness and mechanical integrity of the assembled turbine runner.

Alternatively, the plug can be fixed to the blade by screwing or bolting, with help of screws or bolts and corresponding holes in the plug and in the blade, wherein one or more gaskets can be used for water tightness. This makes the mounting and dismounting of the plug easier.

Figure 4:
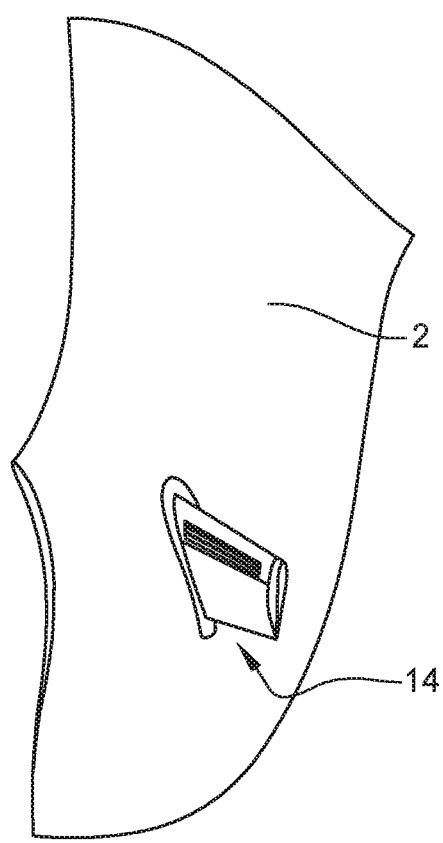
FIG. 4 shows a single runner blade with an inter-blade profile according to the invention.

FIG. 4 shows a runner blade 2 together with an inter-blade profile 14 according to the invention. On this figure, the runner blade has only one profile according to the invention, however several profiles according to the invention can be assembled on a same blade on either the suction or pressure sides of the blade.

Figure 1:
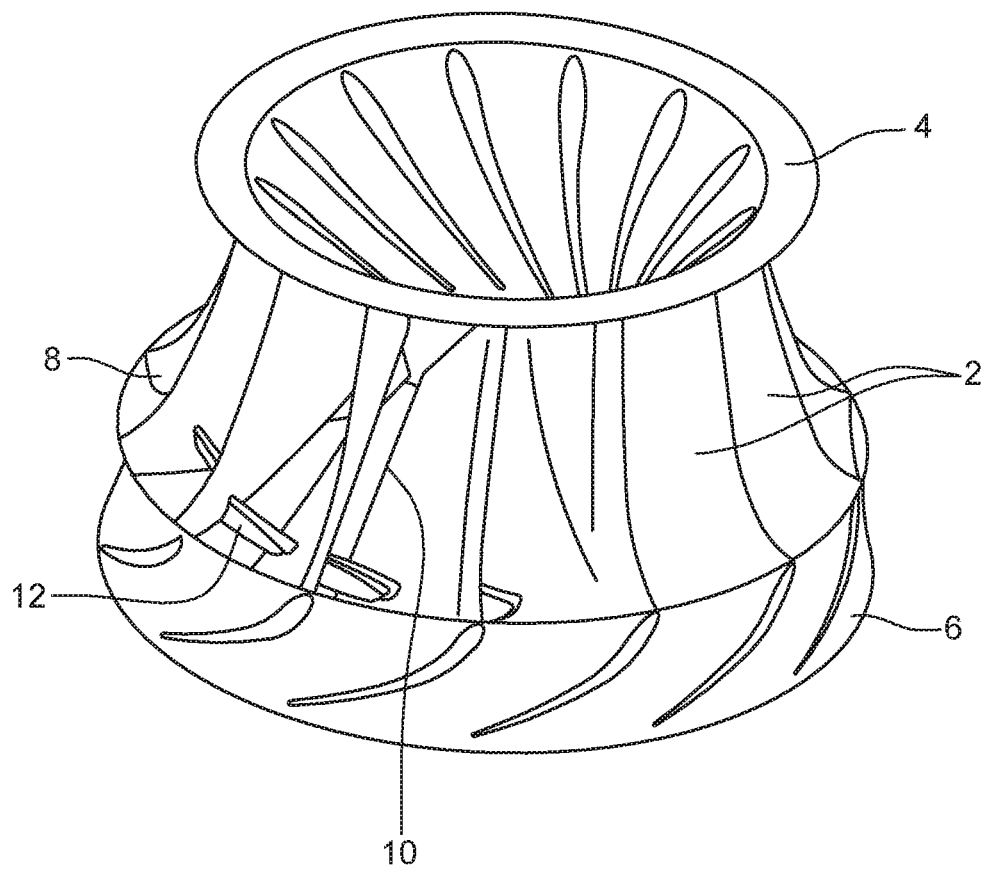
FIG. 1 shows a hydroelectric turbine runner with inter-blade profiles.

A turbine runner according to the invention can comprise runner blades, at least one of them according to the invention, said runner blades being arranged between a crown and a band like on FIG. 1.

Figure 5:
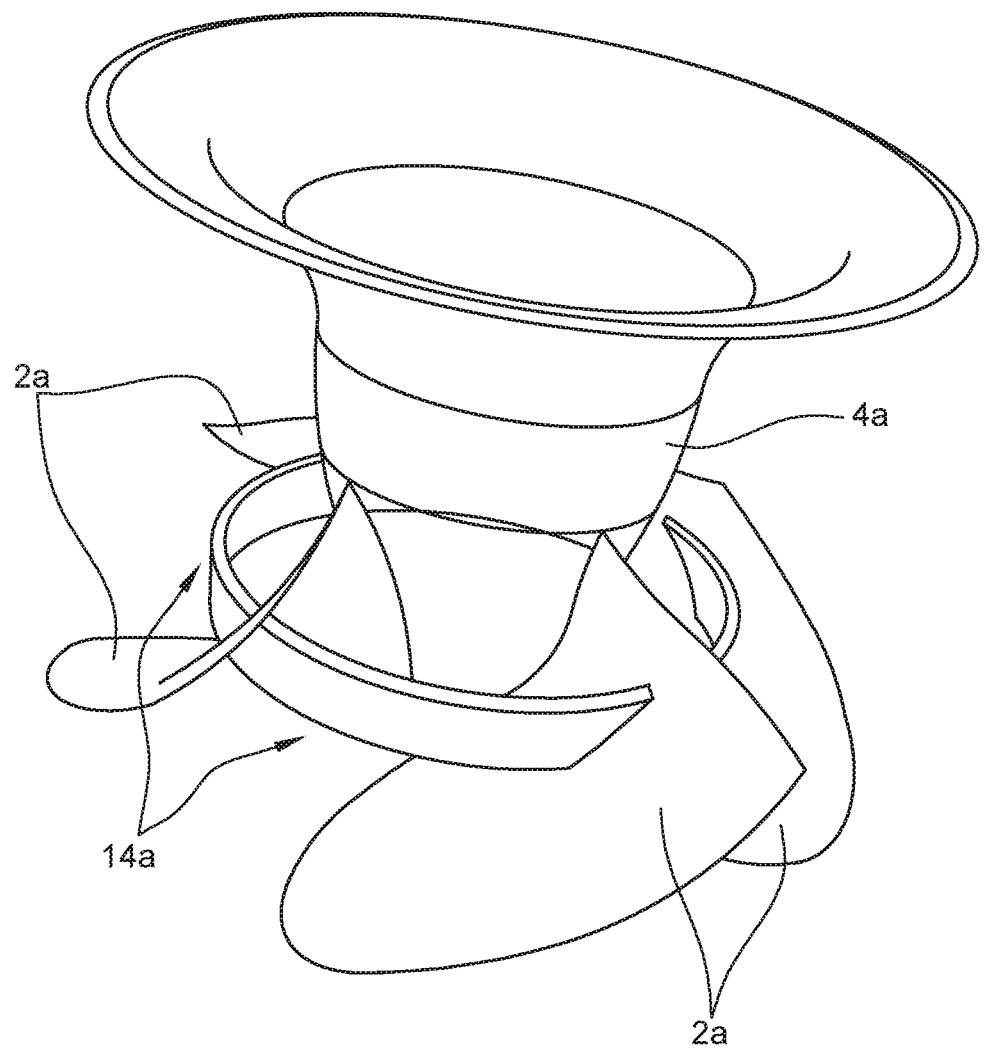
FIG. 5 illustrates inter-blade profiles on blades on a propeller hub.

Alternatively, FIG. 5 shows runner blades 2a mounted on a propeller hub 4a, each blade comprising an inter-blade profile 14a according to the invention, which extends from the suction side of a blade to the pressure side of the neighbouring blade.

Figure 6:
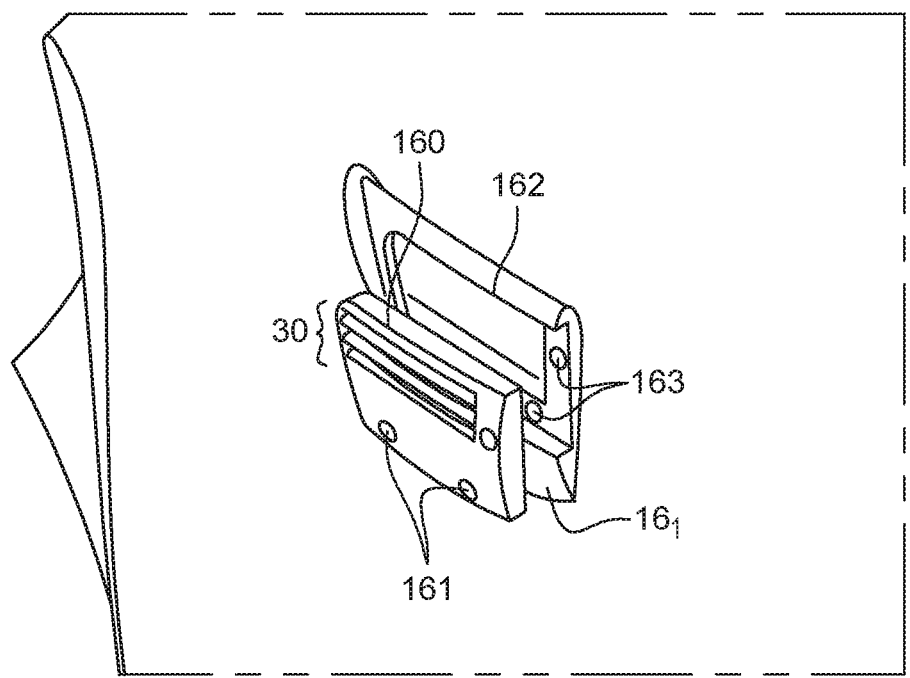
FIGS. 6 and 7 illustrate an inter-blade profile incorporating a removable plate with aeration slots.
Figure 7:
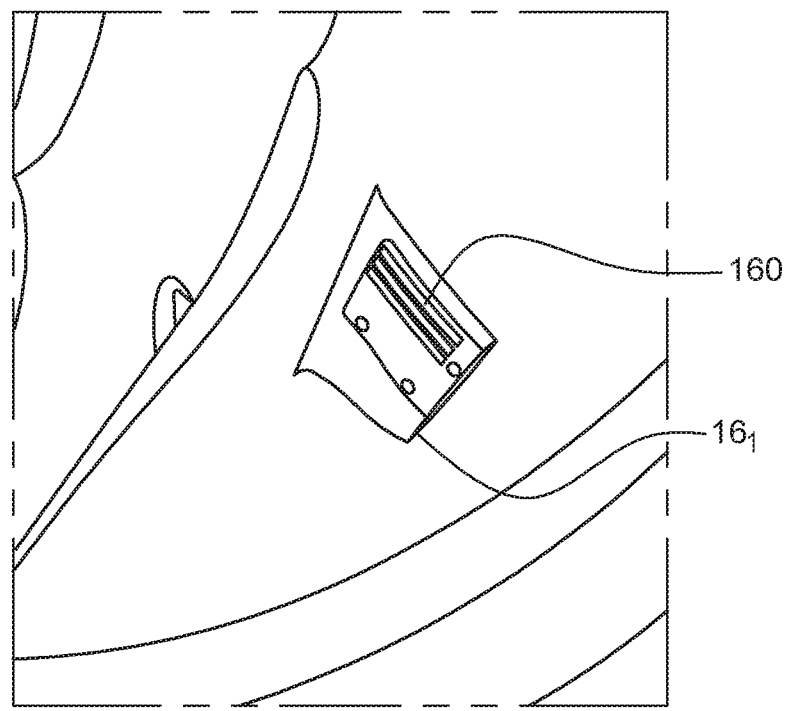

Another aspect of the invention, which can be combined with one or more of the above embodiments of an inter-blade profile, is illustrated on FIGS. 6 and 7.

At least one part 160 of at least one lateral wall $16_1$ or $16_2$ of the inter-blade profile is removable. The other part of the inter-blade profile is fixed to the blade.

Said removable part 160, or cover plate, comprises one or more aeration passage(s) 30, for example at least one slot(s) and/or hole(s), for providing aeration to the water flow. Other shapes of aeration passage were disclosed above in connection with FIGS. 2A and 2D and can be applied to the aeration passages of a removable cover plate according to this aspect of the invention. Other holes 161 (and corresponding holes 163 in the fixed part of the profile, aligned with holes 161) are for securing the removable part 160 to the inter-blade profile with screws. Other securing means like bolts or adhesive material can be implemented.

FIG. 6 shows said removable cover plate 160 and the fixed part of said inter-blade profile 14 before assembly and FIG. 7 shows both these parts assembled together.

Cover plate 160 is sufficiently small and the cover plate can be easily removed without disassembling the turbine, reducing stoppage time.

The cover plate can have a substantially square or rectangular shape as illustrated on FIG. 6 but other shapes can be implemented.

Removing said cover plate 160 from said inter-blade profile:
- offers access to the aeration channel 162 (located behind the cover plate) thus allowing cleaning and/or maintenance of said aeration channel 162 and/or removal of any foreign materials that are too large to fit through the aeration passages and are stuck behind them;
- and/or offers access to the aeration passage(s) 30, thus allowing cleaning and/or maintenance of this/these aeration passage(s) and/or of the outside and/or the inner surface of the cover plate 160;
- and/or allows modifications of the aeration passage(s) geometry or of the geometry of the inter-blade profile itself (since the cover plate itself forms part of the inter-blade profile, its geometry is part of the geometry of the inter-blade profile).

The cover plate 160 can also be replaced with another removable part having for example different aeration slot(s) and/or hole(s).

Thus a damaged cover plate (for example a cover plate having damaged aeration passages) can be easily replaced or design improvements can be integrated into the turbine design without requiring a major stoppage to remove and replace the turbine runner. These modifications can be incorporated directly into the removable and replaceable cover plate 160.

The removable cover plate according to the above embodiments can also be adapted to profiles fabricated together with a blade according to known techniques: it is compatible with a profile mounted on a plug, as explained above in connection with FIGS. 2A-3, but also with a profile made together with the blade (as illustrated on FIG. 1).

A runner can be fabricated, incorporating inter blade profiles, for example according to the above embodiments disclosed in connection with FIGS. 2A to 3. One or more removable cover plate(s) according to the above embodiments can be installed on the thus finished runner, reducing machining time.

The invention claimed is:

1. An inter-blade profile for a turbine runner blade, wherein said inter-blade profile is configured to extend transversely from a turbine runner blade in a water turbine, said inter-blade profile comprising a profile component extending transversely from a plug, the plug forming a base for said profile configured to be inserted into a corresponding hole made in a side wall of said turbine runner blade, the plug comprising an upper side that extends completely around and outwardly beyond said profile and lateral walls such that, when inserted into the hole in the turbine runner blade, the upper side is exposed and flush with the side wall of the turbine runner blade and the lateral walls extend into the turbine runner blade, and the profile extends from the exposed upper side of the plug, and wherein the plug is a separate component from the profile component and joined to a lower part of the profile component.

2. An inter-blade profile according to claim 1, comprising at least one zone with a finite radius of curvature (r) between the lower part of the profile component and the upper side of the plug.

3. An inter-blade profile according to claim 2, said radius of curvature (r) being variable along at least part of said lower part of the profile component and at least part of said upper side of the plug.

4. An inter-blade profile according to claim 1, comprising an internal channel and at least one aeration passage in at least one side of the profile component.

5. An inter-blade profile according to claim 4, said at least one aeration passage comprising at least one slot or at least one hole through at least one side of the profile component.

6. An inter-blade profile according to claim 1, comprising a removable cover plate in a lateral side of the profile component, said cover plate comprising at least one aeration passage, and securing means for securing said removable cover-plate onto said profile component.

7. An inter-blade profile according to claim 6, said at least one aeration passage comprising at least one slot or at least one hole through the cover plate.

8. An inter-blade profile according to claim 6, said securing means comprising at least one hole for at least one screw.

9. A runner blade for a water turbine runner, comprising a blade component comprising a hole in a side wall thereof, and at least one inter-blade profile according to claim 1.

10. A runner blade according to claim 9, said blade component and said at least one inter-blade profile being fixed together.

11. A runner blade according to claim 10, said blade and said at least one inter-blade profile being welded or bolted or glued together.

12. A water turbine runner, comprising a plurality of runner blades, wherein at least one of the runner blades is according to claim 9, said runner blades being arranged between a crown and a band or said runner blades extending from a crown or from a central hub.

13. A method for fabricating a turbine runner having runner blades mounted between a crown and a band, extending from the crown, or extending from a central hub, wherein at least one of the runner blades is in accordance with claim 9, the method comprising:
- fabricating the inter-blade profile separately from the runner blade;
- forming a hole in a lateral wall of the runner blade prior to mounting the runner blade in the turbine runner;
- fixing the inter-blade profile to the hole; and
- subsequently mounting the runner blade in the turbine runner.

14. A method for fabricating a turbine runner having runner blades mounted between a crown and a band, extending from the crown, or extending from a central hub, wherein at least one of the runner blades is in accordance with claim 9, the method comprising:
- fabricating the inter-blade profile separately from the runner blade;
- forming a hole in a lateral wall of the runner blade prior to mounting the runner blade in the turbine runner;
- mounting the runner blade in the turbine runner; and
- subsequently fixing the inter-blade profile to the hole.

* * * * *